Patented May 4, 1937

2,079,416

UNITED STATES PATENT OFFICE 2,079,416

METHOD OF MAKING INDOLYL-3-ACETIC ACID

Richard Helmuth Manske, Ottawa, Ontario, Canada

No Drawing. Application July 6, 1936,
Serial No. 89,128

9 Claims. (Cl. 260—47)

This invention relates to indolyl-3-acetic acid and to its ester, and relates particularly to the production of these substances in a simple manner.

Indolyl-3-acetic acid finds an important field of usefulness in promoting plant growth. It not only stimulates general plant growth but it often initiates the formation of roots at the site of application where root formation is not normal. A minute quantity is in many cases sufficient, a pronounced response being often observable with concentrations as low as one part in a million of appropriate diluent.

The object of the invention is to provide an efficient and economical method for the commercial manufacture of indolyl-3-acetic acid and its ester from materials commercially available.

The method involves the use of the reaction of diazo-acetic ester on indol under controlled conditions and in the presence of a catalyst which will insure an attractive commercial yield.

Broadly the invention consists in reacting diazo-acetic ester with indol in the presence of a catalyst or substance containing copper. This reaction in the presence of a catalyst containing copper can be carried out advantageously as follows: Any suitable container is fitted with a short distillation column and a feeding funnel and arranged for heating on a steam bath with steam. Indol with a small amount of the catalyst is placed in the container and an ethereal solution of ethyl diazoacetate in the funnel. As illustrative of the relative proportions, the diazo-acetic ester from 200 g. glycine-ester hydrochloride in ethereal solution prepared as described below is used per 113 parts of indol. The rate of addition of the ethereal solution is controlled to ensure a smooth reaction between the indol and the ester. The heating is continued, after all the solution has been added, until the reaction is complete. The product obtained from this reaction consists of a crude indolyl-acetic ester. A crude free indolyl-3-acetic acid is obtained by hydrolyzing the crude ester with caustic soda or other alkali, recovering the unsaponifiable material which contains the unreacted indol, by filtration, decantation or other appropriate means, and acidifying the aqueous alkaline solution with a solution of a strong acid such as hydrochloric acid. The crude indolyl-acetic acid is thereby precipitated. Properly carried out, this procedure yields only acidic material. As a further variation, it may be stated that the alkaline solutions as above obtained may be neutralized with a mineral acid, or with more of the crude indolyl-acetic acid, and a crude salt of indolyl-acetic acid thus obtained, either in solution or in dry form by evaporating this solution.

In order to recover a pure ester of indolyl-3-acetic acid, the crude indolyl-acetic ester in the mixture obtained from the reaction of diazo-acetic ester and indol is distilled. The mixture is separated into two fractions by distillation under a pressure of 4 mm. or lower; at 3 mm., for instance, the first fraction distills up to a temperature of 160° C., the other fraction from 160 to 215° C.–230° C., the thermometer being placed above but splashed by the boiling liquid. The first fraction contains unreacted indol, which is thus available for re-use. The second fraction contains the desired product and is redistilled to yield ethyl indolyl-acetate in a yield of about 80% based on indol used up in the reaction vessel. The ethyl indolyl-acetate boils at 166° at 3 mm. or 160° at 2 mm. Hydrolysis of the ester by means of alkali is accomplished by usual methods.

In order to obtain the product in the pure state the reaction product must be carefully fractionated in order to recover unchanged indol and to eliminate diethyl indylene—1:3 diacetate which is formed as a by-product. Diethyl indylene—1:3 diacetate boils at a temperature appreciably higher than the mono-ester and may be purified by distillation.

Indol is a reactive substance and the distillation must be carried out under closely controlled conditions in order to avoid the formation of polymerization and decomposition products.

The ethyl diazoacetate in pure form is employed in ethereal solution. It is prepared by treating glycine ethyl ester hydrochloride with sodium nitrite and sulphuric acid in a known way. The ester is extracted with ether and washed with water, then with aqueous potassium carbonate until neutral, and again with water. The ethereal solution of the ester is then dried.

As catalyst, metallic copper and its compounds such as cuprous oxide, cupric oxide and cuprous chloride, or substances containing copper, are effective. Copper may be conveniently used in the form of finely divided metal or wire and very small quantities are sufficient.

I claim:

1. A method of manufacturing alkyl indolyl-3-acetates which comprises heating indol and alkyl diazoacetates in the presence of a catalyst containing copper.

2. A method of manufacturing alkyl indolyl-3-acetates which comprises heating indol and alkyl diazoacetates in the presence of a catalyst containing copper to a temperature of substantially 100° C.

3. A method of manufacturing indolyl-3-acetic acid which comprises adding an ethereal solution of an alkyl diazoacetate to indol, heating the mixture in the presence of a copper-containing substance to a temperature of substantially 100° C., hydrolyzing the product with alkali, removing the unsaponified material and treating the remaining solution with an acid to precipitate indolyl-3-acetic acid.

4. A method of manufacturing indolyl-3-acetic acid which comprises causing ethyl diazo-acetate to react upon indol at a temperature of substantially 100° C. in the presence of a catalyst containing copper, distilling off uncombined indol, collecting a fraction which distills over up to a temperature of substantially 215° C. and redistilling the same to produce ethyl indolyl-3-acetate.

5. A method of manufacturing indolyl-3-acetic acid which comprises causing ethyl diazo-acetate to react upon indol at a temperature of substantially 100° C. in the presence of a substance containing copper, distilling off uncombined indol, collecting a fraction which distills over up to a temperature of substantially 215° C., redistilling same, and hydrolyzing the distillate to produce indolyl-3-acetic acid.

6. A method of manufacturing ethyl indolyl-3-acetate which comprises heating indol in the presence of a copper catalyst with an ethereal solution of ethyl diazoacetate at substantially 100° C., distilling off under reduced pressure uncombined indol, collecting a fraction which distills over up to a temperature of substantially 215° C. and redistilling the same to produce ethyl indolyl-3-acetate.

7. A method of manufacturing the esters of indolyl-3-acetic acid which comprises heating indol in the presence of a substance containing copper with an ethereal solution of alkyl diazoacetates at substantially 100° C., distilling off under reduced pressure uncombined indol, collecting a fraction which distills over up to a temperature of substantially 215° C. to 230° C., redistilling same.

8. A method as defined in claim 1, wherein the catalyst consists of compounds of copper.

9. A method as defined in claim 1, wherein the catalyst is metallic copper.

RICHARD HELMUTH MANSKE.